(12) United States Patent
Takechi et al.

(10) Patent No.: US 11,750,535 B2
(45) Date of Patent: Sep. 5, 2023

(54) TRANSMITTING DEVICE, RECEIVING DEVICE, PACKET TRANSFER SYSTEM, PACKET TRANSFER METHOD, AND PACKET TRANSFER PROGRAM

(71) Applicant: Nippon Telegraph and Telephone Corporation, Tokyo (JP)

(72) Inventors: Hiroto Takechi, Musashino (JP); Hideki Maeda, Musashino (JP); Daisaku Shimazaki, Musashino (JP); Masaaki Inami, Musashino (JP); Katsuhiro Araya, Musashino (JP); Masatoshi Namiki, Musashino (JP); Masahiro Yokota, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 7 days.

(21) Appl. No.: 17/619,808

(22) PCT Filed: Jun. 20, 2019

(86) PCT No.: PCT/JP2019/024484
§ 371 (c)(1),
(2) Date: Dec. 16, 2021

(87) PCT Pub. No.: WO2020/255327
PCT Pub. Date: Dec. 24, 2020

(65) Prior Publication Data
US 2022/0353206 A1 Nov. 3, 2022

(51) Int. Cl.
*H04L 49/9057* (2022.01)
*H04L 49/253* (2022.01)
*H04L 49/90* (2022.01)

(52) U.S. Cl.
CPC ........ *H04L 49/9057* (2013.01); *H04L 49/254* (2013.01); *H04L 49/9094* (2013.01)

(58) Field of Classification Search
None
See application file for complete search history.

(56) References Cited

U.S. PATENT DOCUMENTS

2008/0279181 A1 11/2008 Shake et al.
2009/0010157 A1* 1/2009 Holmes .................. H04L 47/10
370/230.1

(Continued)

FOREIGN PATENT DOCUMENTS

JP 2005102157 4/2005
JP 2010093421 4/2010

(Continued)

*Primary Examiner* — Kouroush Mohebbi
(74) *Attorney, Agent, or Firm* — Fish & Richardson P.C.

(57) ABSTRACT

A transmission device (10) includes a flow table (11) that stores identification information about an uninterruptible target flow; a transmission-side identification unit (12) that identifies whether a received packet is from the target flow or a non-target flow based on whether the received packet matches the identification information about the target flow stored in the flow table (11); a tag application unit (13) that applies, to packets from the target flow, an uninterruptible identifier indicating that the packets are from the target flow and a sequence number for distinguishing the packets from other packets; and a branch unit (14) that branches the packets from the target flow processed by the tag application unit (13) into packets to be transferred to an active path (41) among redundant routes and packets to be transferred to a backup path (42) among the redundant routes.

4 Claims, 5 Drawing Sheets

(56) References Cited

U.S. PATENT DOCUMENTS

| | | | | |
|---|---|---|---|---|
| 2010/0085980 A1* | 4/2010 | Hinosugi | ............. | H04L 49/552 |
| | | | | 370/412 |
| 2017/0288994 A1* | 10/2017 | Matsuura | ................ | H04L 47/31 |
| 2019/0068486 A1* | 2/2019 | Maehara | ............... | H04L 49/552 |

FOREIGN PATENT DOCUMENTS

| | | |
|---|---|---|
| JP | 2015008396 | 1/2015 |
| JP | 2017188726 | 10/2017 |
| JP | 2019047231 | 3/2019 |

* cited by examiner

TRANSMITTING DEVICE, RECEIVING DEVICE, PACKET TRANSFER SYSTEM, PACKET TRANSFER METHOD, AND PACKET TRANSFER PROGRAM

CROSS-REFERENCE TO RELATED APPLICATIONS

This application is a National Stage application under 35 U.S.C. § 371 of International Application No. PCT/JP2019/024484, having an International Filing Date of Jun. 20, 2019, the disclosure of which is considered part of the disclosure of this application, and is incorporated in its entirety into this application.

TECHNICAL FIELD

The present invention relates to a transmission device, a reception device, a packet transfer system, a packet transfer method, and a packet transfer program.

BACKGROUND ART

An uninterruptible switching control for packets in a network is a technique for continuously establishing a communication by using a backup-system route without causing a packet loss (i.e., uninterruptibly) even when a failure occurs in an active-system route among redundant routes (when a failure occurs in one of two systems). Accordingly, a plurality of routes which have the same combination of a start point and an end point but have different relay destinations are prepared in advance as redundant routes.

Patent Literature 1 describes, as an example of the uninterruptible switching control, a method for making a plurality of copies of packets transmitted from a transmission device, transmitting the packets to redundant routes, buffering the plurality of packets received by a reception device in a memory, selecting one of the same packets, and transferring the selected packet.

CITATION LIST

Patent Literature

Patent Literature 1: Japanese Patent Laid-Open No. 2005-102157

SUMMARY OF THE INVENTION

Technical Problem

The uninterruptible switching control has been performed without exception on all flows of lines for the same route (same destination). Accordingly, a burden on the reception device increases as a flow rate increases. For example, as the length of a redundant route increases, a delay difference between a first packet transmitted via an active-system route and a second packet transmitted via a backup-system route increases. Therefore, there is a need for a higher level of memory performance (memory capacity, memory processing speed) of a reception device for buffering the first packet until the second packet is arrived.

Figure 7:
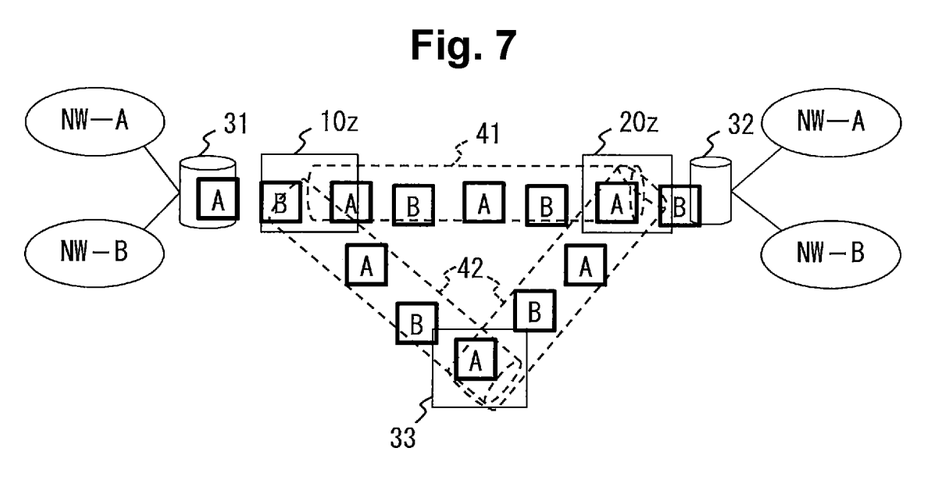
FIG. 7 is a configuration diagram illustrating an uninterruptible transfer system of related art.

FIG. 7 is a configuration diagram illustrating an uninterruptible transfer system of related art. A transmission-side router 31 to be connected to a transmission device 10z accommodates two user networks (NW-A, NW-B). A reception-side router 32 to be connected to a reception device 20z also accommodates two user networks. In the figure, a flow of the user network (NW-A) is represented by "A" and a flow of the user network (NW-B) is represented by "B". Two redundant routes (an active path 41 and a backup path 42) are formed from the transmission device 10z to the reception device 20z. The active path 41 is a working path that directly connects the transmission device 10z and the reception device 20z. The backup path 42 is a protection path that connects from the transmission device 10z to the reception device 20z via a relay device 33.

In this case, in the two flows "A, B", copies of all packets are made and the same packets are caused to flow to each of the active path 41 and the backup path 42 by an uninterruptible switching control.

However, the reception device 20z needs to collectively perform reception processing on all flows, so that a load is concentrated. Accordingly, there is a concern that deficiency in performance may occur due to an increase in the number of users (users C, D, . . . ) in the future.

Accordingly, a major object of the present invention is to reduce a burden on the reception device in the uninterruptible switching control.

Means for Solving the Problem

To attain the above-described object, a transmission device according to the present invention has the following features. The present invention includes a flow storage unit that stores identification information about an uninterruptible target flow; a transmission-side identification unit that identifies whether a received packet is from the target flow or a non-target flow based on whether the received packet matches the identification information about the target flow stored in the flow storage unit;

a tag application unit that applies, to packets from the target flow, an uninterruptible identifier indicating that the packets are from the target flow, and a sequence number for distinguishing the packets from other packets; and a branch unit that branches the packets from the target flow processed by the tag application unit into packets to be transferred to an active path among redundant routes and packets to be transferred to a backup path among the redundant routes.

Effects of the Invention

According to the present invention, it is possible to reduce a burden on a reception device in uninterruptible switching control.

DESCRIPTION OF EMBODIMENTS

An embodiment of the present invention will be described in detail below with reference to the drawings.

Figure 1:
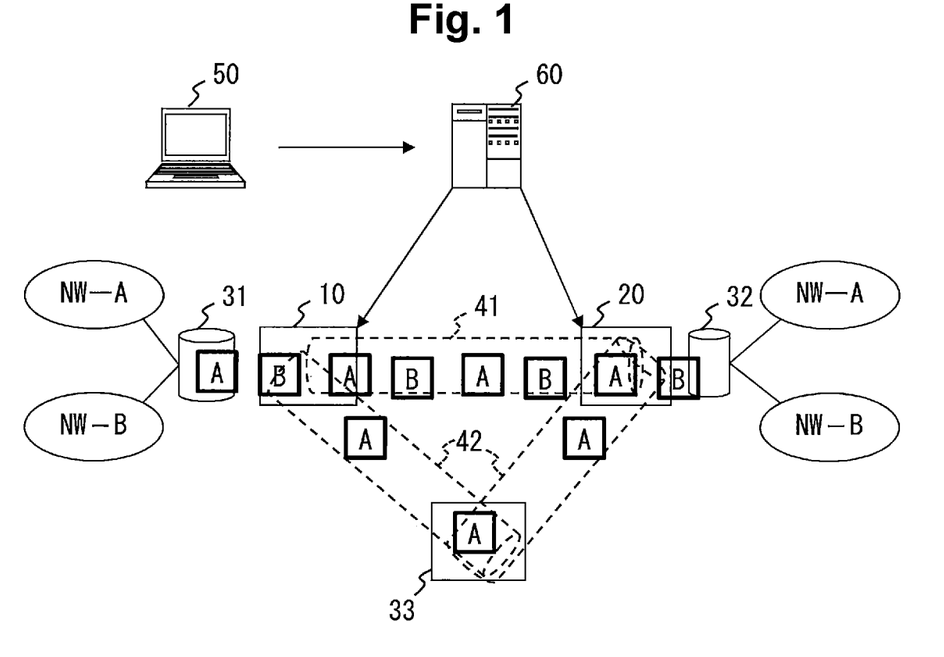
FIG. 1 is a configuration diagram illustrating a packet transfer system according to an embodiment of the present invention.

FIG. 1 is a configuration diagram illustrating a packet transfer system.

A transmission-side router 31 that is connected to a transmission device 10 accommodates two user networks (NW-A, NW-B). A reception-side router 32 that is connected to a reception device 20 also accommodates two user networks. A flow of the user network (NW-A) is represented by "A", and a flow of the user network (NW-B) is represented by "B".

Two redundant routes (an active path 41 and a backup path 42) are formed from the transmission device 10 to the reception device 20. The active path 41 is a working path that directly connects the transmission device 10 and the reception device 20. The backup path 42 is a protection path that connects from the transmission device 10 to the reception device 20 via the relay device 33.

Main differences between a system illustrated in FIG. 7 and a system illustrated in FIG. 1 will be described below. The transmission device 10z illustrated in FIG. 7 transfers packets copied for all flows "A, B" of the same destination without exception to the backup path 42. On the other hand, the transmission device 10 illustrated in FIG. 1 transfers only packets from the uninterruptible target flow "A" designated from a management server 60 to the backup path 42, and excludes the uninterruptible non-target flow "B", which is not designated, from the uninterruptible switching control target.

The reception device 20 executes uninterruptible processing on the packets from the target flow "A" (for details, see FIG. 3) and transfers the packets to the reception-side router 32, while the reception device 20 does not execute the uninterruptible processing on the non-target flow "B" and directly transfers the packets to the reception-side router 32.

The management server 60 sets, in the transmission device 10, the target flow "A" on which the uninterruptible is executed in response to a request from a user terminal 50. The user terminal 50 causes a user to define the target flow "A" (for details, see FIGS. 4 and 5).

Figure 2:
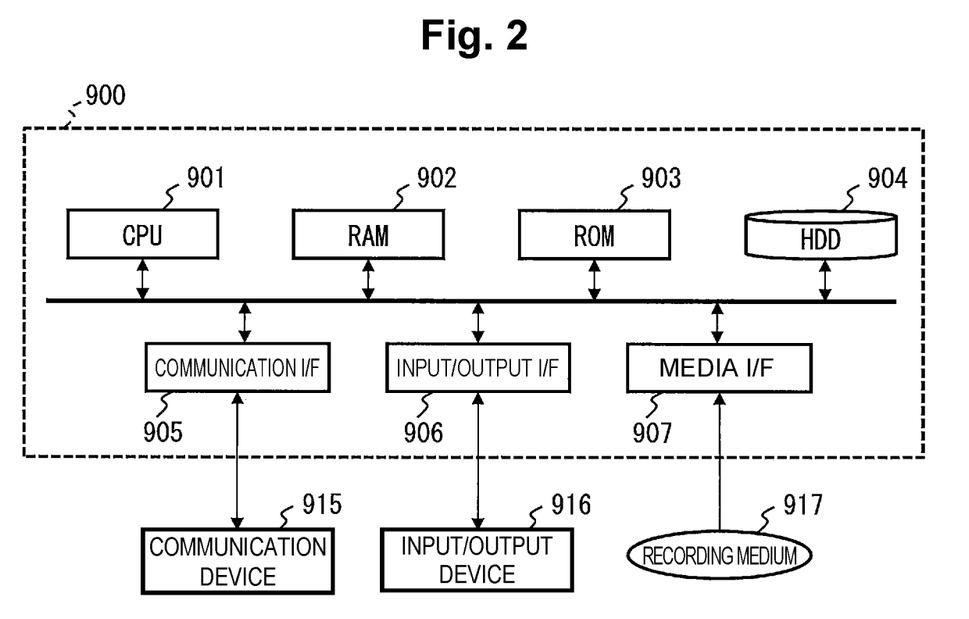
FIG. 2 is a block diagram illustrating a computer used in the packet transfer system according to the present embodiment.

FIG. 2 is a block diagram illustrating a computer used in the packet transfer system.

Each of the devices in the packet transfer system, such as the user terminal 50, the management server 60, the transmission device 10, and the reception device 20, which are described in FIG. 1, is configured as a computer 900 including a CPU 901, a RAM 902, a ROM 903, a HDD 904, a communication I/F 905, an input/output I/F 906, and a media I/F 907.

The communication I/F 905 is connected to an external communication device 915. The input/output I/F 906 is connected to an input/output device 916. The media I/F 907 reads or writes data from or to the recording medium 917. Further, the CPU 901 controls each processing unit by executing a program (or an application, which can be abbreviated as "app") loaded into the RAM 902. This program can be distributed via a communication line, or can be recorded on the recording medium 917, such as a CD-ROM, to be distributed.

Figure 3:
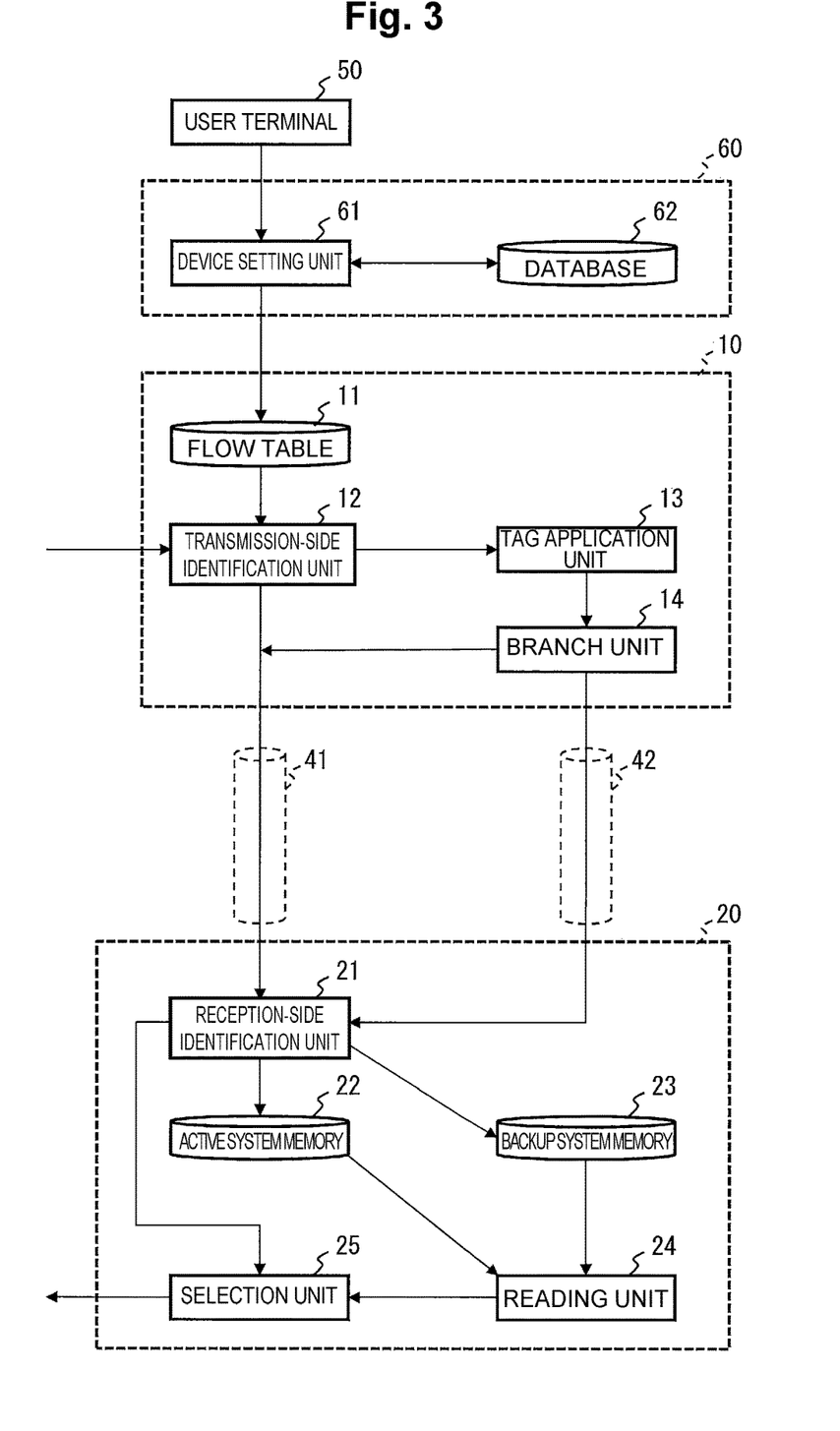
FIG. 3 is a detailed block diagram illustrating each device in the packet transfer system according to the present embodiment.

FIG. 3 is a detailed block diagram of each of the devices in the packet transfer system.

The management server 60 includes a device setting unit 61 and a database 62. The device setting unit 61 reflects the setting for the target flow requested from the user terminal 50 in the transmission device 10. In this case, the device setting unit 61 may determine whether a new target flow can be received, and may reflect the setting for the target flow if the new target flow can be received. Thus, it is possible to prevent excess of the throughput of the network system in advance. The database 62 stores various settings for the target flow when it is determined that the target flow can be received. Examples of the various settings for the target flow include network configuration data, available buffer amount management data in the reception device 20, and uninterruptible setting management data.

The transmission device 10 includes a flow table (flow storage unit) 11, a transmission-side identification unit 12, a tag application unit 13, and a branch unit 14.

In the flow table 11, target flow setting information is set according to an instruction from the device setting unit 61. The transmission-side identification unit 12 identifies whether packets received from an external device, such as the transmission-side router 31, are from the target flow defined in the flow table 11. Packets from the target flow are transferred from the transmission-side identification unit 12 to the tag application unit 13, and packets from a non-target flow are transferred from the transmission-side identification unit 12 to the active path 41.

The tag application unit 13 applies a sequence number and an uninterruptible identifier (for details, see FIGS. 4 and 5) immediately after an ETH header of each packet from the target flow. Note that the sequence number is used to identify the same packets between a first packet received via the active path 41 and a second packet received via the backup path 42. The uninterruptible identifier indicates that the packets in the own device are from the target flow.

The branch unit 14 branches (copies) the packets from the target flow into two systems, and transfers the packets to each of the active path 41 and the backup path 42.

The reception device 20 includes a reception-side identification unit 21, an active system memory 22, a backup system memory 23, a reading unit 24, and a selection unit 25.

The reception-side identification unit 21 identifies the received packets into the target flow and the non-target flow depending on whether the uninterruptible identifier is present or not. The first packet from the target flow is stored in the active system memory 22, and the second packet from the target flow is stored in the backup system memory 23. The first packet from the non-target flow is directly communicated to the selection unit 25. The reading unit 24 refers to the sequence number, and absorbs a delay difference between the first packet read from the active system memory 22 and the second packet read from the backup system memory 23. In other words, one of the first packet and the second packet to which the same sequence number is assigned is communicated to the selection unit 25.

The selection unit 25 receives the packets from the target flow and the packets from the non-target flow, and transfers the packets to the external device such as the reception-side router 32. In this case, it may be desirable for the selection unit 25 to preferentially select the packets from the target flow than the packets from the non-target flow and to transfer the packets to the external device. Thus, uninterruptible packets with a higher service request are processed promptly, thereby making it possible to increase the user's satisfaction level.

Note that the sequence number and the uninterruptible identifier in each packet are deleted before the packet is transferred to the external device.

Figure 4:
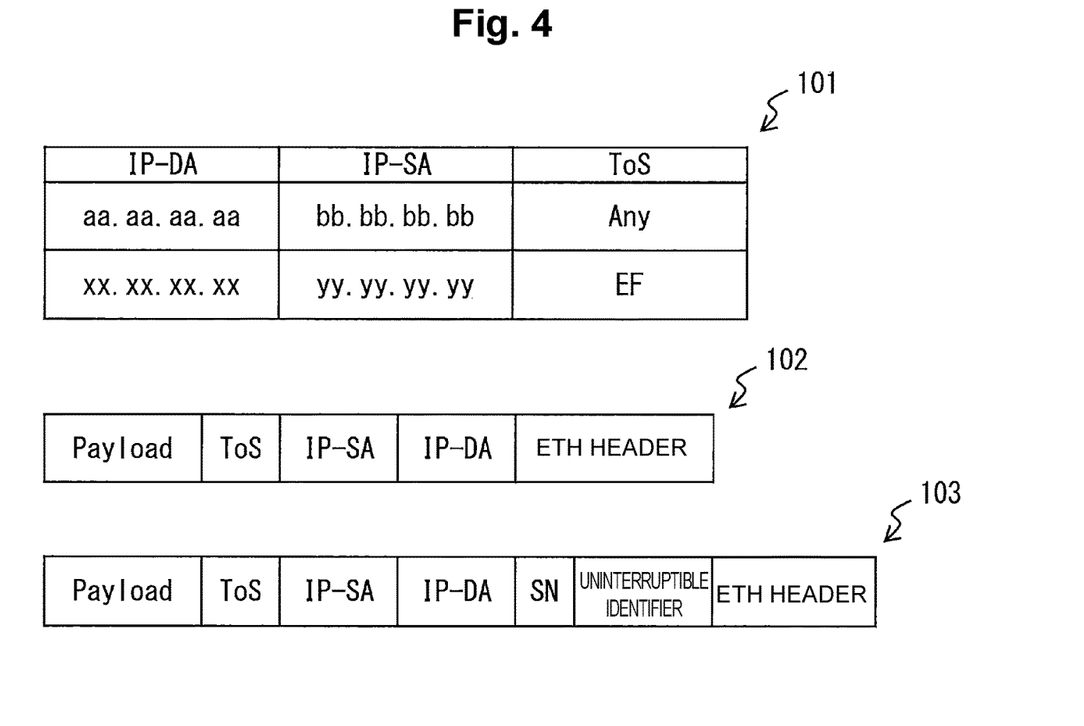
FIG. 4 is an explanatory diagram when first flow identification information according to the present embodiment is used.

FIG. 4 is an explanatory diagram when first flow identification information is used.

The flow table 11 stores, as a list of target flow identification information, information 101 indicating a combination of a destination IP address (IP-DA), a source IP address (IP-SA), and ToS (Type of Service).

The transmission-side identification unit 12 identifies a packet 102 that matches the information 101, which indicates the combination of <IP-DA, IP-SA, ToS> and is stored in the flow table 11, as the target flow.

The tag application unit 13 applies the sequence number (SN) and the uninterruptible identifier immediately after the ETH header of the packet 102 from the target flow, and obtains a packet 103 to be transmitted.

The combination information 101 consists only of standard header information, such as <IP-DA, IP-SA, ToS>, which is included in almost all packets. This facilitates the user to designate the target flow. Further, in a case where different IP-SAs are used for respective departments in the same company, more detailed designation can be performed, for example, when only the flow for a specific department is preferentially set.

Figure 5:
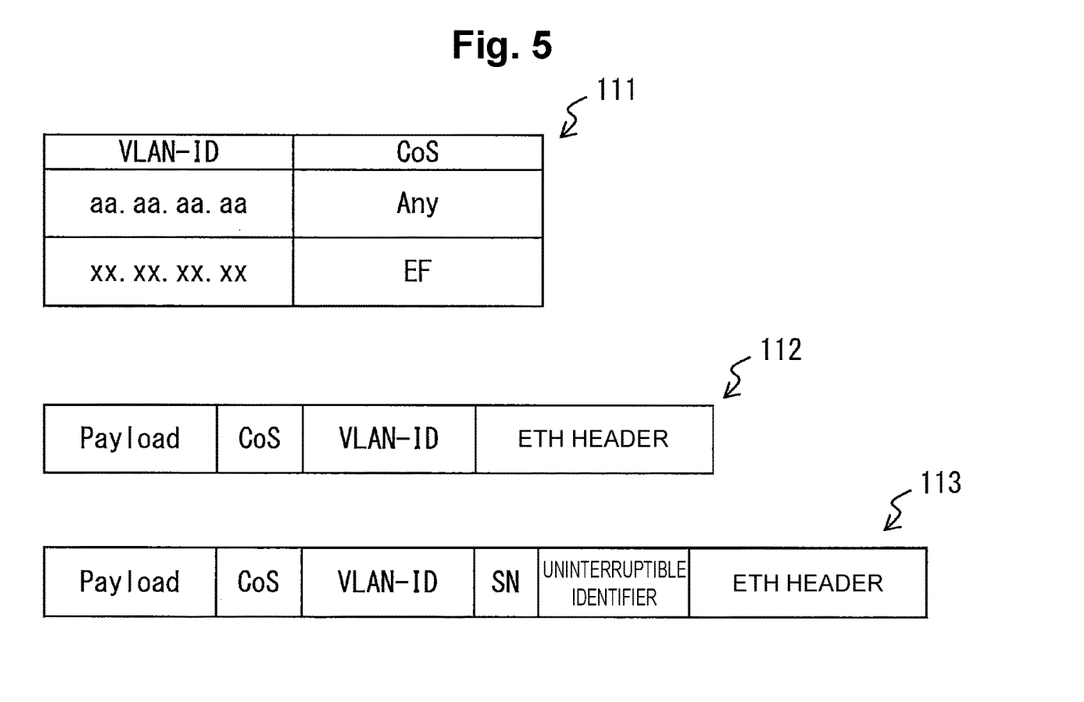
FIG. 5 is an explanatory diagram when second flow identification information according to the present embodiment is used.

FIG. 5 is an explanatory diagram when second flow identification information is used.

The flow table 11 stores, as a list of target flow identification information, information 111 indicating a combination of VLAN-ID (Virtual Local Area Network-ID) and CoS (Class of Service).

The transmission-side identification unit 12 identifies a packet 112 that matches the information 111, which indicates the combination of <VLAN-ID, CoS> and is stored in the flow table 11, as the target flow.

The tag application unit 13 applies the sequence number and the uninterruptible identifier immediately after the ETH header of the packet 112 from the target flow, and obtains a packet 113 to be transmitted. The combination information 111 consists only of a small amount of header information, such as <VLAN-ID, CoS>. Accordingly, the burden on the transmission-side identification unit 12 to read the header information can be reduced. That is, the throughput for the packet 113 from the target flow can be enhanced.

Figure 6:
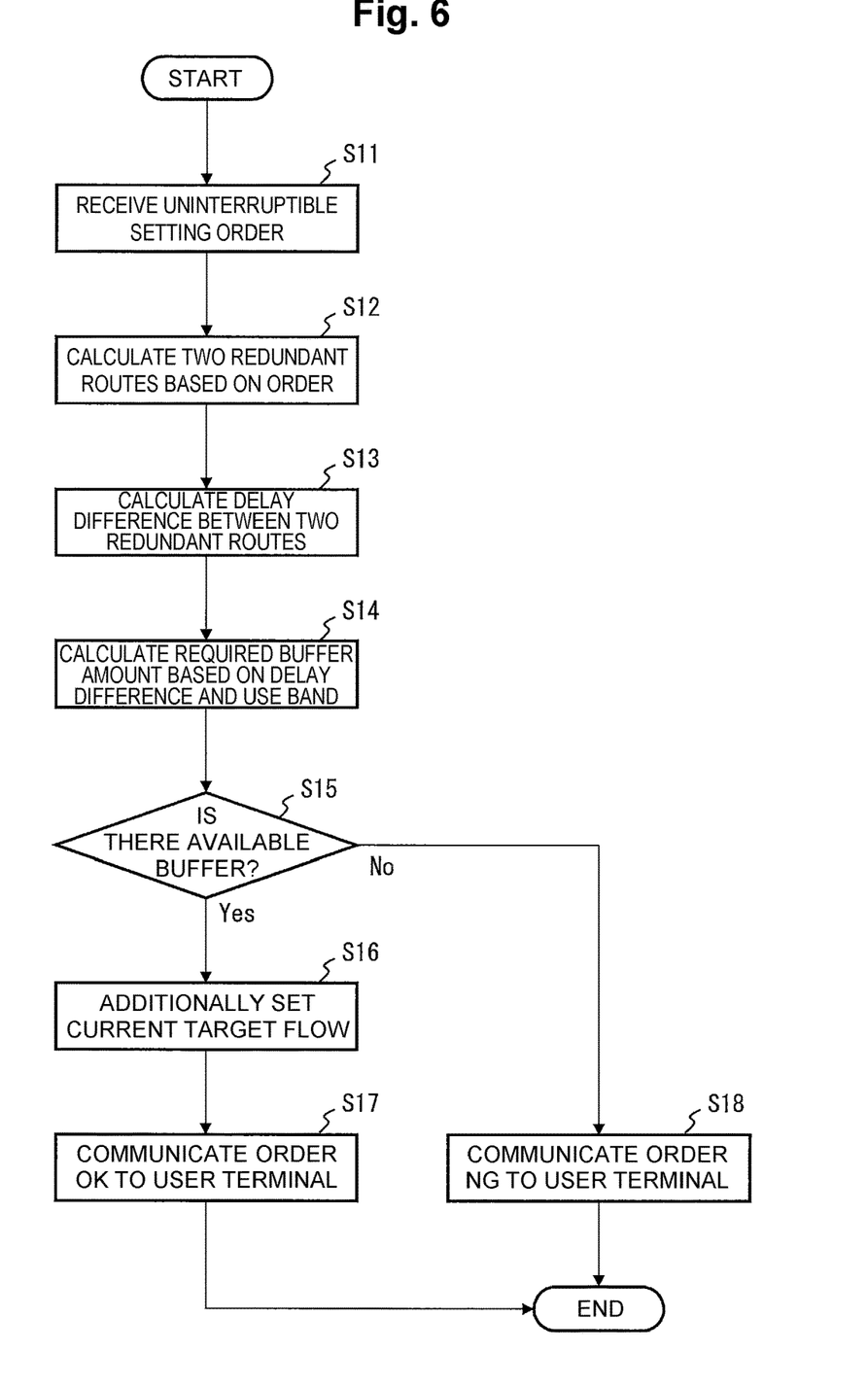
FIG. 6 is a flowchart illustrating processing in a management server according to the present embodiment.

FIG. 6 is a flowchart illustrating processing of the management server 60. In S11, the device setting unit 61 receives, from the user terminal 50, an order for setting the uninterruptible. This order includes, for example, the following information.

An ID of a start point device from the target flow in the user networks (NW-A, NW-B), an ID of an end point device, or a line ID in the user networks (NW-A, NW-B)

A date and time when the target flow is used (e.g., 2019/6/12 10:00 to 2019/6/13 12:00)

Flow identification information illustrated in FIGS. 4 and 5

Target flow use band (e.g., 20 Gbps)

In S12, the device setting unit 61 calculates two redundant routes (routes for the active path 41 and the backup path 42) based on the order received in S11. In S13, the device setting unit 61 calculates a delay difference between the two redundant routes obtained in S12. Note that, as a delay amount in each route, a setting value for the delay amount preliminarily set in a server may be used, or an actually measured value obtained by performing a delay measurement using a delay measurement function may be used. The delay measurement function is implemented as, for example, OAM (Operations, Administration, Maintenance) functions of Ethernet(R). In S14, the device setting unit 61 calculates a buffer amount required for buffering the target flow in the reception device 20 based on the delay difference obtained in S13 and the use band of the target flow. This calculation formula is, for example, delay difference [2 ms]×use band [20 Gbps]=buffer amount 5 [MBytes]. This makes it possible to continuously hold the first packet, which is first arrived, without being discarded from the reception device 20, until the second packet, which is arrived next, reaches the reception device 20.

In S15, the device setting unit 61 determines whether an available buffer amount of the reception device 20 (active system memory 22) managed by the database 62 is greater than the required buffer amount calculated in S14. If the determination result indicates Yes in S15, the processing proceeds to S16, and if the determination result indicates No, the processing proceeds to S18.

In S16, the device setting unit 61 adds identification information about the current target flow to the flow table 11 through the transmission-side identification unit 12. Then, the content of the database 62 is updated based on the content of the added target flow. As a result, for example, the available buffer amount of the active system memory 22 is subtracted by the amount corresponding to the required buffer amount calculated in S14.

In S17, the device setting unit 61 communicates information indicating that the order received in S11 is acceptable (OK) to the user terminal 50.

In S18, the device setting unit 61 communicates information indicating that the order received in S11 is refused (NG) to the user terminal 50.

Advantageous Effects

The transmission device 10 according to the present invention includes the flow table 11 that stores identification information about an uninterruptible target flow; the transmission-side identification unit 12 that identifies whether a received packet is from the target flow or a non-target flow based on whether the received packet matches the identification information about the target flow stored in the flow table 11; the tag application unit 13 that applies, to packets from the target flow, an uninterruptible identifier indicating that the packets are from the target flow, and a sequence number for distinguishing the packets from other packets; and the branch unit 14 that branches the packets from the target flow processed by the tag application unit 13 into packets to be transferred to the active path 41 among redundant routes and packets to be transferred to the backup path 42 among the redundant routes.

With this configuration, the number of packets to be transmitted from the transmission device 10 to the redundant route is reduced, thereby making it possible to reduce a burden (request performance such as a buffer memory amount) on the reception device 20. In practice, it is less likely to receive an order for setting all flows as the uninterruptible target flow, and in many cases, only some important flows are set as the target flow, thereby making it possible to satisfy the user's needs.

The reception device 20 according to the present invention includes the reception-side identification unit 21 that identifies whether a received packet is from an uninterruptible target flow or a non-target flow; a memory (active system memory 22, backup system memory 23) that stores packets from the target flow identified by the reception-side identification unit 21; the reading unit 24 that reads one packet from a plurality of the same packets from the target flow, the plurality of the same packets being present in the memory; and the selection unit 25 that selects and sequentially transfers the packets from the target flow read by the reading unit 24 and packets from the non-target flow identified by the reception-side identification unit 21.

Consequently, it is possible to reduce a burden (request performance such as a buffer memory amount) on the reception device 20 by limiting the uninterruptible switching control in the reception device 20 only to the packets from the target flow.

The packet transfer system according to the present invention includes the transmission device 10 and the management server 60 that sets identification information about the target flow stored in the flow table 11. The management server 60 calculates a memory amount required for buffering the target flow based on the delay difference between the active path 41 and the backup path 42 with respect to the reception device 20 that receives packets from the target flow, and permits setting of the identification information about the target flow in the flow table 11 when the reception device 20 can provide a memory amount more than the required memory amount.

With this configuration, the identification information about the target flow depending on the performance of the reception device 20 can be set in the flow table 11, thereby preventing deficiency in performance of the reception device 20 before the flow is allowed to pass.

REFERENCE SIGNS LIST

10 Transmission device
11 Flow table (flow storage unit)
12 Transmission-side identification unit
13 Tag application unit
14 Branch unit
20 Reception device
21 Reception-side identification unit
22 Active system memory
23 Backup system memory
24 Reading unit
25 Selection unit
31 Transmission-side router
32 Reception-side router
33 Relay device
41 Active path
42 Backup path
50 User terminal
60 Management server
61 Device setting unit
62 Database

The invention claimed is:

1. A transmission device comprising:
a flow storage unit that stores identification information about target flow that is uninterruptible;
a transmission-side identification unit that identifies whether a received packet is from the target flow or a non-target flow based on determining whether a combination of a destination address, a source address, and a type of service of the received packet or a combination of a virtual local area network-identifier and a class of service of the received packet matches a record included in the identification information about the target flow stored in the flow storage unit;
a tag application unit that applies, to packets from the target flow, an uninterruptible identifier indicating that the packets are from the target flow and a sequence number for distinguishing the packets from other packets; and
a branch unit that branches the packets from the target flow processed by the tag application unit into i) packets to be transferred to an active path, that directly connects the transmission device and a reception device, and ii) packets to be transferred to a backup path, that connects the transmission device to the reception device via a relay device.

2. A reception device comprising:
a reception-side identification unit that receives a first set of packets included in a target flow and a second set of packets included in a non-target flow and identifies whether a received packet is from the target flow or the non-target flow, the target flow being uninterruptible;
a memory that stores the first set of packets from the target flow identified by the reception-side identification unit;
a reading unit that reads, for each of the first set of packets, one packet from a plurality of same packets from the target flow, the plurality of same packets being present in the memory; and
a selection unit that
receives the first set of packets included in the target flow and the second set of packets included in the non-target flow,
selects the first set of packets in the target flow read by the reading unit and transfers the first set of packets in the target flow to an external device, and
after transferring the first set of packets in the target flow, transfer the second set of packets from the non-target flow identified by the reception-side identification unit to the external device.

3. A packet transfer system comprising:
a transmission device according to claim 1; and
a management server that sets identification information about the target flow stored in the flow storage unit,
wherein the management server calculates a memory amount required for buffering the target flow based on a delay difference between the active path and the backup path with respect to a reception device that receives packets from the target flow, and permits setting of the identification information about the target flow in the flow storage unit when the reception device can provide a memory amount more than the memory amount required for buffering the target flow.

4. A packet transfer method comprising:
storing identification information about a target flow in a flow storage unit, the target flow being uninterruptible;
identifying whether a received packet is from the target flow or a non-target flow based on determining whether a combination of a destination address, a source address, and a type of service of the received packet or a combination of a virtual local area network-identifier and a class of service of the received packet matches a record included in the identification information about the target flow stored in the flow storage unit;
applying, to packets from the target flow, an uninterruptible identifier indicating that the packets are from the target flow and a sequence number for distinguishing the packets from other packets; and
branching the packets from the target flow into i) packets to be transferred to an active path, that directly connects a transmission device and a reception device, and ii) packets to be transferred to a backup path, that connects the transmission device to the reception device via a relay device.

\* \* \* \* \*